(12) United States Patent
Nakajima (10) Patent No.: US 11,826,909 B2
(45) Date of Patent: Nov. 28, 2023

(54) DRIVING MECHANISM, ROBOT APPARATUS, METHOD FOR CONTROLLING DRIVING MECHANISM, METHOD OF MANUFACTURING AN ARTICLE USING ROBOT ARM, AND STORAGE MEDIUM

(71) Applicant: CANON KABUSHIKI KAISHA, Tokyo (JP)

(72) Inventor: Yohji Nakajima, Fuchu-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 16/422,812

(22) Filed: May 24, 2019

(65) Prior Publication Data

US 2019/0366537 A1    Dec. 5, 2019

(30) Foreign Application Priority Data

May 31, 2018  (JP) ................................ 2018-105482

(51) Int. Cl.
| | |
|---|---|
| *B25J 9/12* | (2006.01) |
| *F16H 49/00* | (2006.01) |
| *B25J 9/10* | (2006.01) |
| *B25J 13/08* | (2006.01) |
| *F16H 19/00* | (2006.01) |

(52) U.S. Cl.
CPC ............. *B25J 9/126* (2013.01); *B25J 9/102* (2013.01); *B25J 13/085* (2013.01); *F16H 19/005* (2013.01); *F16H 49/001* (2013.01)

(58) Field of Classification Search
CPC .......... B25J 9/126; B25J 9/102; B25J 13/085; F16H 49/001; F16H 19/005
See application file for complete search history.

(56) References Cited

U.S. PATENT DOCUMENTS

| | | | | |
|---|---|---|---|---|
| 4,828,451 | A * | 5/1989 | Mikoshi ............... | G05B 19/182 414/735 |
| 5,205,163 | A | 4/1993 | Sananikone | |
| 5,819,202 | A * | 10/1998 | Sato .................... | G05B 19/4061 700/184 |
| 6,127,792 | A * | 10/2000 | Kamiya ................ | B25J 9/1656 318/434 |
| 9,228,509 | B2 * | 1/2016 | Maeda ...................... | H02P 5/46 |
| 9,321,177 | B2 * | 4/2016 | Ikeda ................. | G05B 19/4065 |
| 9,364,952 | B2 * | 6/2016 | Arai ....................... | B25J 9/1633 |
| 9,410,856 | B2 | 8/2016 | Kamiya | |
| 9,647,513 | B2 * | 5/2017 | Park ...................... | H02K 11/21 |

(Continued)

FOREIGN PATENT DOCUMENTS

| | | |
|---|---|---|
| CN | 103517840 A | 1/2014 |
| CN | 107848119 A | 3/2018 |

(Continued)

*Primary Examiner* — Ryan Rink
*Assistant Examiner* — Rodney P King
(74) *Attorney, Agent, or Firm* — Canon U.S.A., Inc. I.P. Division (57) ABSTRACT

A driving mechanism that relatively displaces first and second links includes a motor, a reduction gear, and a torque sensor including a hollow portion, wherein the reduction gear includes an input shaft that is rotated by drive of the motor, the torque sensor is arranged between the reduction gear and the first link, and the input shaft penetrates through the hollow portion of the torque sensor.

20 Claims, 9 Drawing Sheets

(56) References Cited

U.S. PATENT DOCUMENTS

9,677,953 B2 * 6/2017 Kamiya ................ B25J 19/028
2015/0100159 A1 4/2015 Park

FOREIGN PATENT DOCUMENTS

| CN | 107921625 A | 4/2018 |
| JP | H05252779 A | 9/1993 |
| JP | 2018-015836 A | 2/2018 |

* cited by examiner

DRIVING MECHANISM, ROBOT APPARATUS, METHOD FOR CONTROLLING DRIVING MECHANISM, METHOD OF MANUFACTURING AN ARTICLE USING ROBOT ARM, AND STORAGE MEDIUM

BACKGROUND OF THE INVENTION

Field of the Invention

The present disclosure relates to a driving mechanism.

Description of the Related Art

Recently, a robot apparatus has been used in a production line of various industrial products. The robot apparatus generally includes a robot arm having a robot hand, and performs an operation by holding a workpiece with the robot hand and moving the held workpiece by the robot arm.

In the above-described production line, various workpieces such as a soft object, a lightweight object, and a low-strength member may be handled. In such a case, it is not possible to apply great force to the workpieces to prevent breakage or deformation of the workpieces. In a case where such workpieces are operated by the robot apparatus, there is a method for controlling the force applied to each of the workpiece with high accuracy by detecting the force applied to the workpiece using a torque sensor provided in a driving mechanism of each joint of the robot arm and giving feedback thereon to drive control of the robot arm.

However, in a case where the torque sensor is provided in the driving mechanism of each of the joints, it is necessary to provide a wire such as a signal wire of the torque sensor in the joint where an operation amount is large. In this case, drive of the joint causes bending and twisting of the wire of the torque sensor, which result in shortening of a life of the wire.

Figure 9:
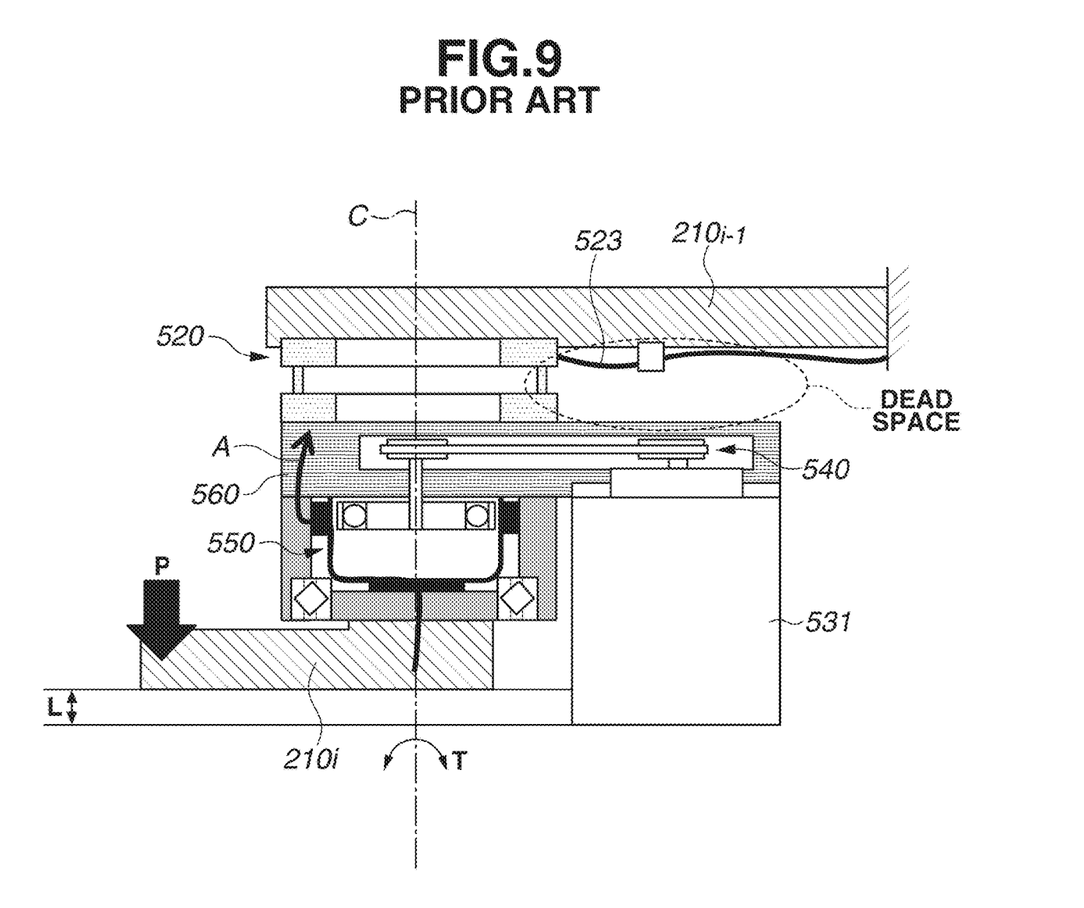
FIG. 9 is a diagram illustrating a joint portion of a conventional robot arm.

In a technique described in Japanese Patent Application Laid-Open No. 2018-015836, a torque sensor is arranged at a position where bending and twisting of a wire of the torque sensor is unlikely to be caused by drive of a joint. FIG. 9 schematically illustrates a structure of the joint described in Japanese Patent Application Laid-Open No. 2018-015836.

FIG. 9 illustrates an outline of a driving mechanism 500 described in Japanese Patent Application Laid-Open No. 2018-015836 based on FIGS. 2 and 3 thereof. In FIG. 9, a robot arm described in Japanese Patent Application Laid-Open No. 2018-015836 includes a second link $210_i$ that rotates by rotation of a motor 531 transmitted to a reduction gear 550 by a transmission mechanism 540, and a first link $210_{i-1}$ that does not rotate. In providing a torque sensor 520, the torque sensor 520 is provided in the first link $210_{i-1}$ that is not driven to rotate, and a support member 560 is provided between the second link $210_i$ that is driven to rotate and the torque sensor 520. In addition, the support member 560 includes the motor 531 and the reduction gear 550. Rotation of the motor 531 is transmitted to an input shaft of the reduction gear 550 by the transmission mechanism 540, which includes a belt and a pulley, so that the second link $210_i$ is rotated about a rotation axis C.

Accordingly, torque T generated in a rotation direction of the second link $210_i$ can be transmitted to the torque sensor 520 via the support member 560 as indicated by an arrow A even if the torque sensor 520 is arranged at a position where a wire 523 is less affected by rotation of the second link $210_i$. As a result, bending and twisting of the wire 523 of the torque sensor 520 that are caused by rotation of the joint are reduced, and the shortening of the life of the wire is prevented.

In the technique described in Japanese Patent Application Laid-Open No. 2018-015836, the reduction gear 550, the support member 560, and the torque sensor 520 are all arranged in series in a direction of the rotation axis C of the second link $210_i$, and the motor 531 is included in the support member 560 so that a rotating shaft of the motor 531 is to be parallel to the rotation axis C. Accordingly, this arrangement can prevent a joint portion from becoming longer in the rotation axis C direction than in a case where the motor 531 is arranged in series in the rotation axis C direction.

However, the arrangement used in Japanese Patent Application Laid-Open No. 2018-015836 causes a dead space as illustrated in FIG. 9, and depending on a size of the motor 531, a part of the motor 531 may protrude from the second link $210_i$ by a length L in the rotation axis C direction. Thus, an instance arises that a range of choice for the motor 531 to be provided in the driving mechanism of each joint may be narrowed in an aim to downsize the robot arm.

SUMMARY OF THE INVENTION

The present disclosure is directed to a driving mechanism that can prevent a joint portion from becoming long even in a case where a torque sensor is arranged at a position where a wire of the torque sensor is not bent nor twisted, and that can widen the range of choice for the motor.

According to an aspect of the present disclosure, the present disclosure provides a driving mechanism that relatively displaces first and second links and includes a motor, a reduction gear, and a torque sensor including a hollow portion and that detects torque, wherein the reduction gear includes an input shaft that is rotated by drive of the motor, wherein the torque sensor is arranged between the reduction gear and the first link, and wherein the input shaft penetrates through the hollow portion of the torque sensor.

Further features of the present disclosure will become apparent from the following description of exemplary embodiments with reference to the attached drawings.

DESCRIPTION OF THE EMBODIMENTS

Various exemplary embodiments of the present disclosure will be described below with reference to the attached drawings. The exemplary embodiments described below are merely examples, and, for example, a detail configuration thereof can be appropriately modified by a person skilled in the art without departing from the scope of the present disclosure. In addition, values described in the present exemplary embodiments are reference numerical values and do not limit the present disclosure.

Figure 1:
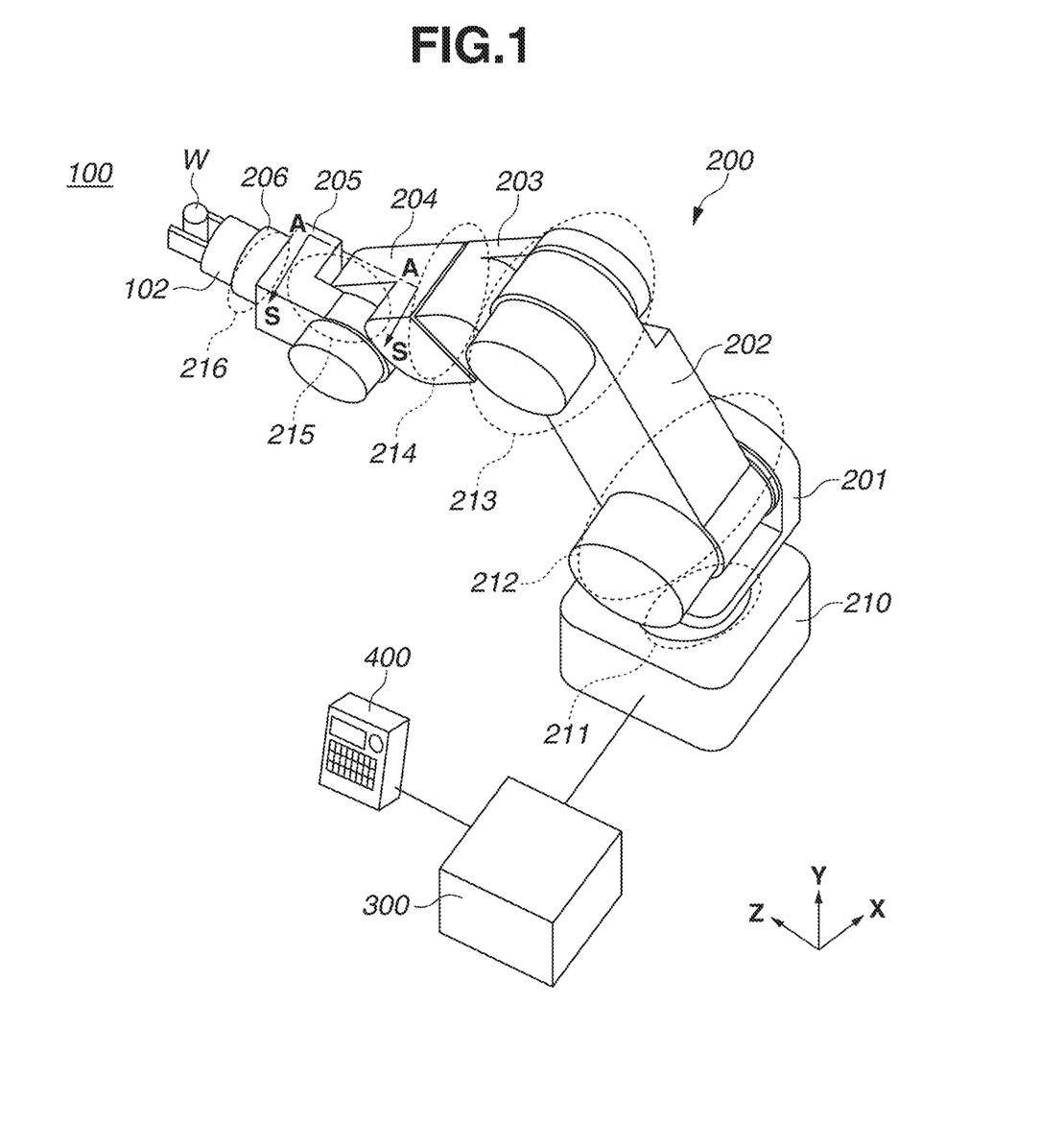
FIG. 1 is a diagram schematically illustrating a configuration of a robot system according to a first exemplary embodiment.

FIG. 1 is a perspective view schematically illustrating a robot system 100 according to a first exemplary embodiment of the present disclosure. As illustrated in FIG. 1, the robot system 100 includes a robot arm main body 200 that performs assembly of a workpiece W, a control apparatus 300 that controls the robot arm main body 200, and an external input apparatus 400 connected to the control apparatus 300.

Figure 3:
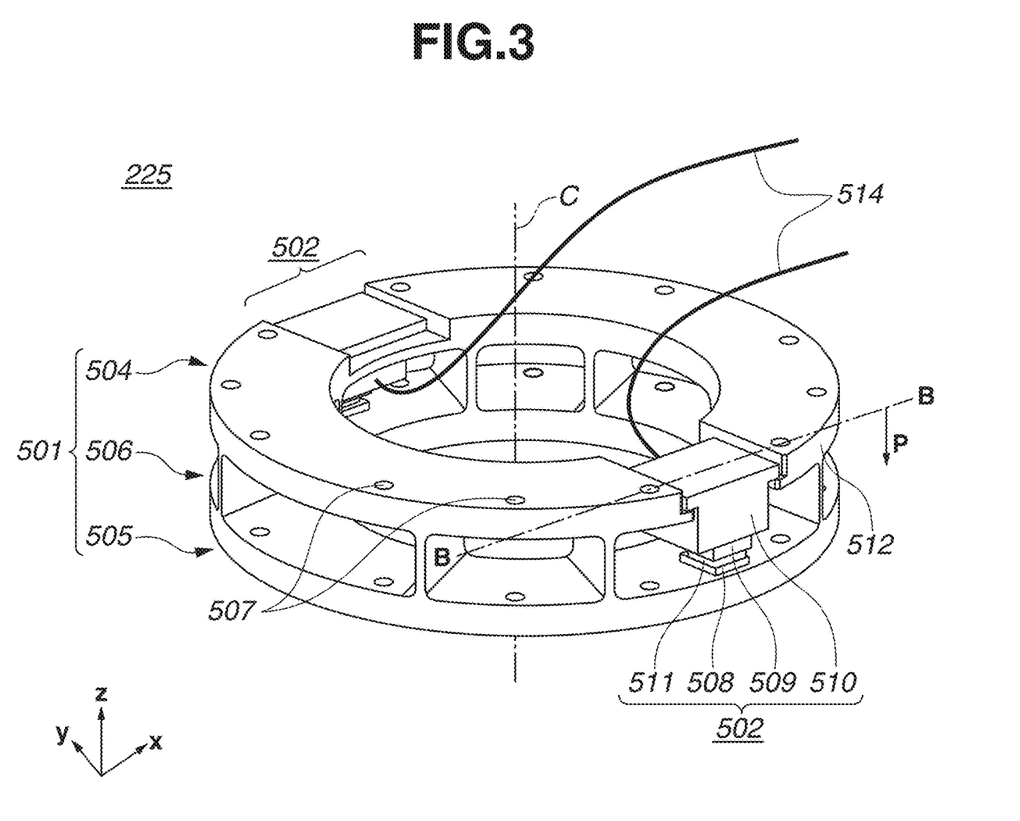
FIG. 3 is a diagram schematically illustrating a configuration of a torque sensor according to the first exemplary embodiment.

The robot arm main body 200 includes a base unit 210 that is fixed to a workbench, a plurality of links 201 to 206 that transmit displacement and force, and a plurality of joints 211 to 216 that pivotably or rotatably couple the links 201 to 206 together. Portions each enclosed with a broken line in FIG. 1 represent the joints 211 to 216. Further, the joints 211 to 216 respectively include torque sensors 221 to 226 each detecting a torque value applied to the joint (FIG. 3).

In FIG. 1, the base unit 210 and the link 201 of the robot arm main body 200 are connected by the joint 211. The joint 211 has a movable range of, for example, approximately ±180 degrees from an initial posture.

The link 201 and the link 202 of the robot arm main body 200 are connected by the joint 212. The joint 212 has a movable range of, for example, approximately ±80 degrees from an initial posture.

The link 202 and the link 203 of the robot arm main body 200 are connected by the joint 213. The joint 213 has a movable range of, for example, approximately ±70 degrees from an initial posture.

The link 203 and the link 204 of the robot arm main body 200 are connected by the joint 214. The joint 214 has a movable range of, for example, approximately ±180 degrees from an initial posture.

The link 204 and the link 205 of the robot arm main body 200 are connected by the joint 215. The joint 215 has a movable range of, for example, approximately ±120 degrees from an initial posture.

The link 205 and the link 206 of the robot arm main body 200 are connected by the joint 216. The joint 216 has a movable range of, for example, approximately ±240 degrees from an initial posture.

According to the present exemplary embodiment and an exemplary embodiment described below, the joint 215 disposed between the links 204 and 205 is described as an example. Further, the present exemplary embodiment can be implemented as long as at least one of the plurality of joints 211 to 216 of the robot arm main body 200 has a configuration same as that of the joint 215, and it is not necessary that all the joints have the configuration similar to that of the joint 215. Each of the joints 211 to 215 is a driving mechanism for driving the robot arm main body 200 according to the present exemplary embodiment.

The link 206 at a tip of the robot arm main body 200 is provided with a robot hand main body 102.

The robot hand main body 102 includes a plurality of fingers that can hold the workpiece W, and an actuator (not illustrated) that drives the plurality of fingers. The robot hand main body 102 can hold the workpiece by driving the plurality of fingers.

Manufacturing of an article is performed by the robot hand main body 102 holding the workpiece W, which is an object, and assembling the workpiece W to another workpiece.

The robot system 100 further includes the external input apparatus 400 as a teaching apparatus that transmits data of a plurality of teaching points to the control apparatus 300. The external input apparatus 400 is operated by a person, and is used to specify an operation of the robot arm main body 200 by the control apparatus 300.

The control apparatus 300 controls an operation of the robot arm main body 200 based on a command from the external input apparatus 400, and the workpiece W held by the robot hand main body 102 can be moved to any three-dimensional position.

Figure 2:
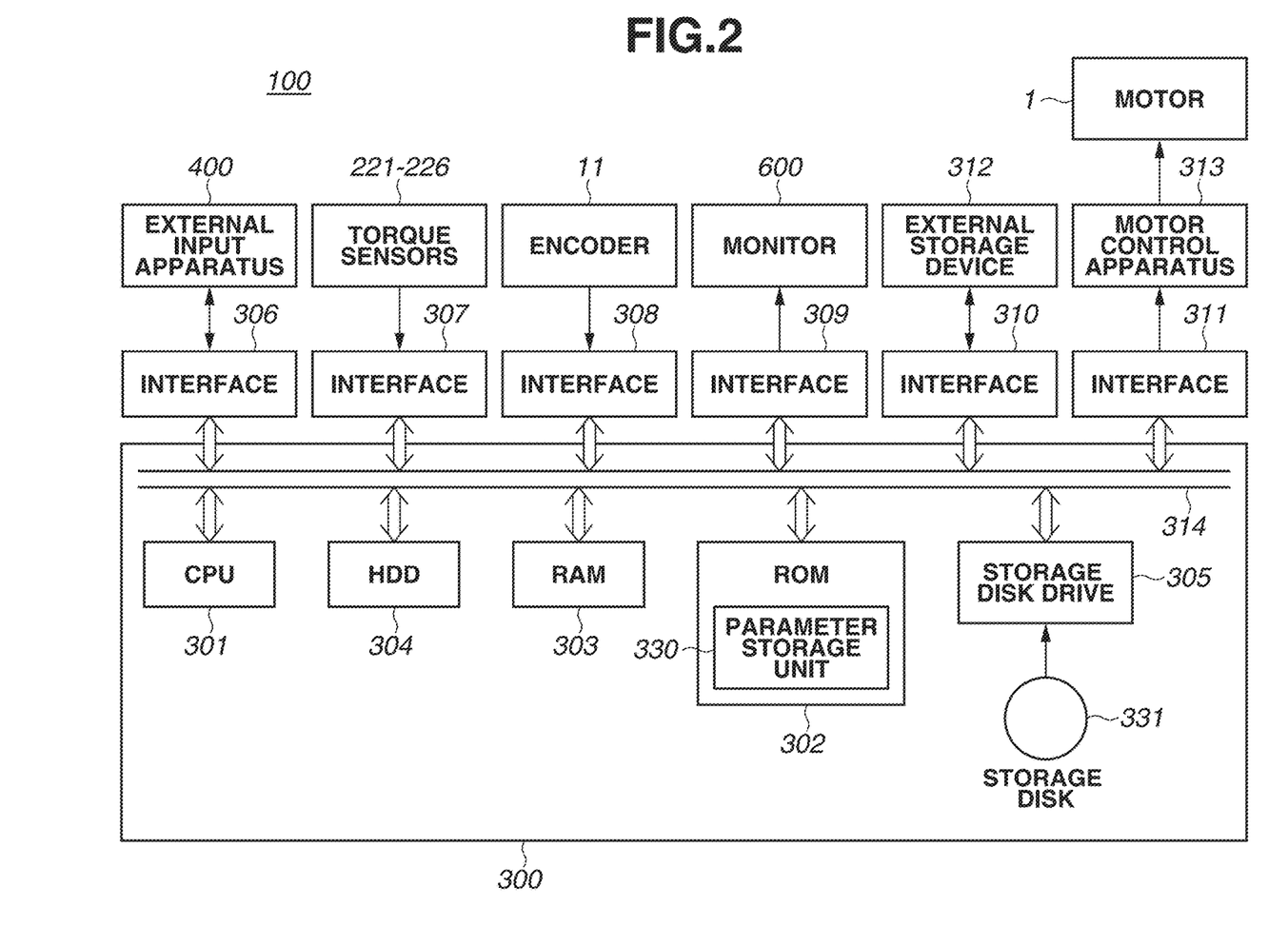
FIG. 2 is a block diagram illustrating control of the robot system according to the first exemplary embodiment.

FIG. 2 is a block diagram illustrating a control system of the robot system 100 according to the first exemplary embodiment of the present disclosure. In FIG. 2, the control apparatus 300 includes a central processing unit (CPU) 301, a read-only memory (ROM) 302, a random access memory (RAM) 303, a hard disk drive (HDD) 304, a storage disk drive 305, and various interfaces 306 to 311.

The CPU 301 is connected with the ROM 302, the RAM 303, the HDD 304, the storage disk drive 305, and the various interfaces 306 to 311 via a bus 314. The ROM 302 stores a basic program such as a basic input output system (BIOS). The RAM 303 is a storage unit that temporarily stores a calculation processing result of the CPU 301.

The ROM 302 stores a parameter storage unit 330 that stores a parameter necessary for operating the CPU 301.

The HDD 304 is a storage unit for storing a calculation processing result and various data (including a best command trajectory and a best evaluation value).

In addition, a rotary-driving system of each of the joints 211 to 216 includes an interface and is connected with the external input apparatus 400 via the bus 314.

The external input apparatus 400 outputs an input target joint angle of each of the joints 211 to 216 to the CPU 301 via the interface 306 and the bus 314.

Through the interface 307, each of the torque sensors 221 to 226 is connected with the control apparatus 300, and the above-described detected torque value is output to the CPU 301 via the interface 307 and the bus 314.

Through the interface 308, an encoder 11 that detects a rotation angle of a rotating shaft of a motor 1 is connected with the control apparatus 300. A pulse signal representing a detected value of the encoder 11 is output to the CPU 301 via the interface 308 and the bus 314.

Through the interface 309, a monitor 600 is connected with the control apparatus 300, and the monitor 600 displays various images.

The interface 310 is configured so that an external storage device 312 such as a rewritable nonvolatile memory and an external HDD can be connected with the control apparatus 300. The storage disk drive 305 can read various data and programs stored in a storage disk (storage medium) 331. The storage medium that stores a program according to the present exemplary embodiment is not limited to the storage disk 331 and includes the nonvolatile memory and the external HDD of the external storage device 312.

Through the interface 311, a motor control apparatus 313 is connected with the control apparatus 300. The CPU 301 outputs data of a drive command indicating a control amount of the rotation angle of the motor 1 at predetermined intervals to the motor control apparatus 313 via the bus 314 and the interface 311.

The motor control apparatus 313 calculates an output amount of a current to the motor 1 based on the drive command input from the CPU 301 and supplies the current to the motor 1 to control joint angles of the joints 211 to 216 of the robot arm main body 200. In other words, the CPU 301 controls drive of the joints 211 to 216 by the motor 1 via the motor control apparatus 313 so that the detected torque values of the joints 211 to 216 become target torque.

According to the present exemplary embodiment, the motor control apparatus 313 is constituted of a single control apparatus. Alternatively, the motor 1 provided in each of the joints 211 to 216 may include a motor control apparatus individually.

FIG. 3 is a diagram illustrating a structure of the torque sensor 225 according to the present exemplary embodiment. FIG. 3 illustrates the torque sensor 225 as a representative of the torque sensors 221 to 226, and each of the torque sensors 221 to 224 and 226 includes a structure similar to that in FIG. 3. In FIG. 3, the torque sensor 225 includes a frame 501 having a cylindrical shape and optical encoders 502. The optical encoders 502 are oppositely arranged on a circumference of the frame 501 with the rotation axis C as the center.

The frame 501 includes a first fixing member 504, a second fixing member 505, and coupling members 506 that are arranged on the circumference of the frame 501 and coupling both of the fixing members together in a relatively movable manner. The first fixing member 504, the second fixing member 505, and the coupling members 506 are integrally formed of a same material in the present exemplary embodiment. The first fixing member 504 includes a mounting portion 512 on which a detection head support unit 510 is mounted. The first fixing member 504 is an example of a first structure, and the second fixing member 505 is an example of a second structure.

The first fixing member 504 and the second fixing member 505 have hollow cylindrical shapes as illustrated in FIG. 3. The first fixing member 504 and the second fixing member 505 function as flange portions each to be fastened to a measuring object that is relatively displaced.

The coupling members 506 are formed as rib-shaped members that connect the first fixing member 504 with the second fixing member 505 both having doughnut shapes. The plurality of coupling members 506 is radially arranged with the rotation axis C as the center between the first fixing member 504 and the second fixing member 505.

A plurality of fastening portions 507 each to be fastened to the measuring object is arranged on the first fixing member 504 and the second fixing member 505. In the present exemplary embodiment, 12 screw holes used for screwing are arranged on each of the first fixing member 504 and the second fixing member 505 as the fastening portions 507.

Each component of the frame 501 is made of a predetermined material, such as resin and metal (steel, stainless steel, etc.) having an elastic modulus corresponding to a target torque detection range and a required resolution. In addition, the frame 501 may be manufactured by a three-dimensional (3D) printer. More specifically, the frame 501 can be manufactured by generating slice data for a 3D printer from design data (for example, a computer-aided design (CAD) data) of the frame 501 and inputting the slice data to a conventional 3D printer.

Each of the optical encoders 502 has a function as an optical position sensor. The optical encoder 502 includes a scale 508 and a detection head 509 that detects position information from the scale 508. The detection head 509 is attached to the detection head support unit 510, and a space between the detection head 509 and the scale 508 facing each other is sealed with a sealing member 511.

Figure 4:
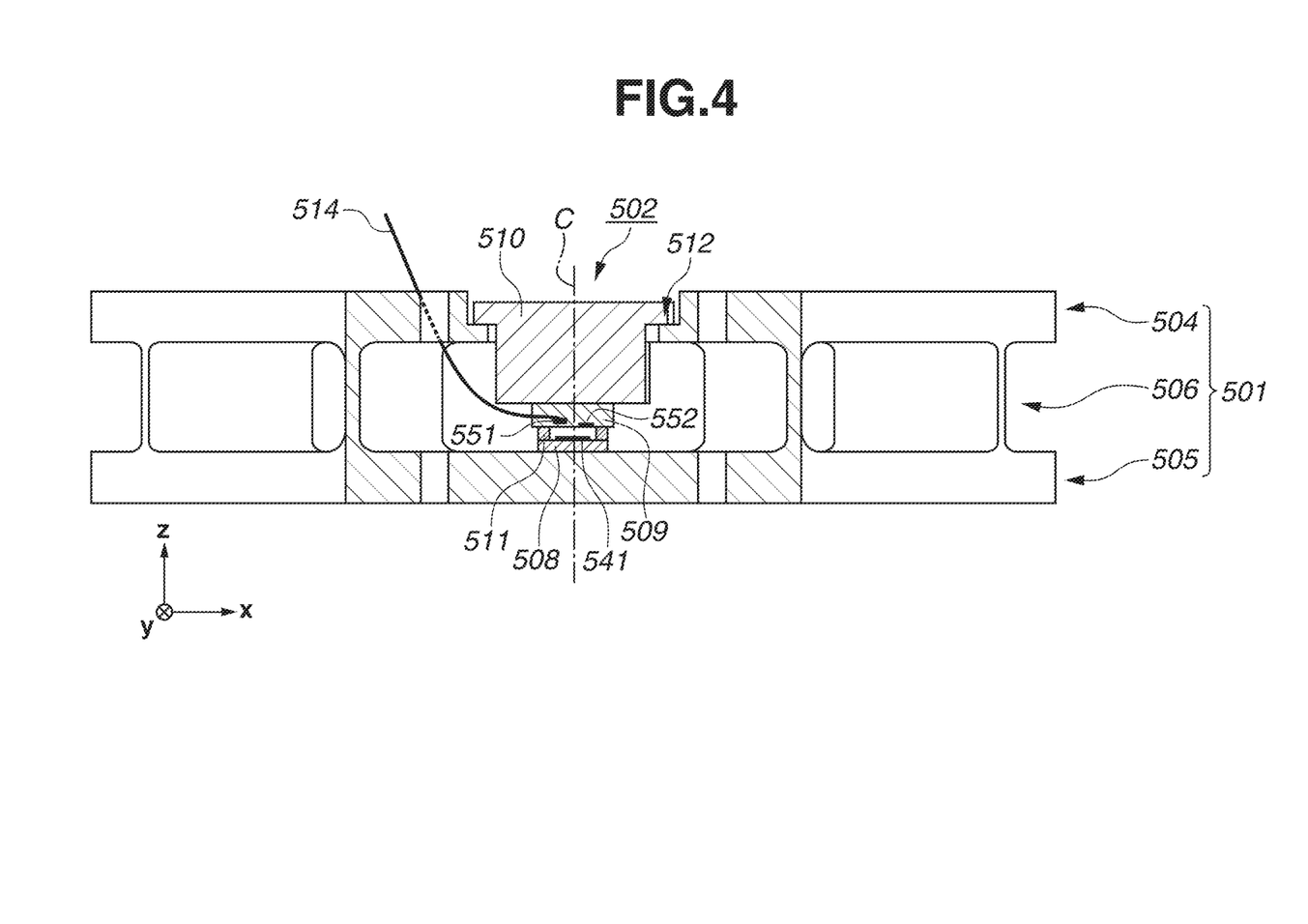
FIG. 4 is a cross-sectional view obtained by cutting along a dashed-dotted line BB in an arrow P direction in FIG. 3.

FIG. 4 is a cross-sectional view corresponding to part of the optical encoder 502 serving as a detection unit for detecting a relative movement amount of the first fixing member 504 and the second fixing member 505, and corresponding to a cross section taken along a dashed-dotted line BB in an arrow P direction in FIG. 3. In FIG. 4, the detection head support unit 510 is fixed to the first fixing member 504.

The optical encoder 502 includes the detection head 509 serving as a detecting portion and the scale 508 serving as a detected portion. The detection head 509 is disposed on the detection head support unit 510, and the scale 508 is disposed on the second fixing member 505.

The scale 508 is fixed to the second fixing member 505, and the detection head 509 is fixed to the detection head support unit 510.

The scale 508 is a reflection type scale and includes a lattice arrangement optical pattern 541. The optical pattern 541 is formed of, for example, aluminum (Al) and chromium (Cr).

The detection head 509 is a reflection type detection head and includes a light emitting element 551 and a light receiving element 552.

The sealing member 511 seals an irradiation space, in which the optical pattern 541 is irradiated with light from the light emitting element 551 of the detection head 509, so as to prevent intrusion by dust, and a wire 514 for supplying electric power to the light emitting element 551 is provided.

The detection head 509 irradiates the scale 508 with the light from the light emitting element 551, and the light receiving element 552 receives light reflected from the optical pattern 541 of the scale 508.

The detection head 509 is disposed on the first fixing member 504 and the scale 508 is disposed on the second fixing member 505. However, the arrangement may be reversed. As long as a relative movement amount can be detected, the detection head 509 may be disposed on either the first fixing member 504 or the second fixing member 505, and the scale 508 may be disposed on the other.

In a case where torque around the rotation axis C is applied, and the first fixing member 504 and the second fixing member 505 are relatively rotated, a relative position between the detection head 509 and the scale 508 is changed. Then, an irradiation position of the light with which the scale 508 is irradiated moves on the scale 508.

At this time, if the light with which the scale 508 is irradiated passes the optical pattern 541 disposed on the scale 508, a light amount detected by the light receiving element 552 of the detection head 509 is changed.

The relative movement amount of the first fixing member 504 to the second fixing member 505 is detected from a change of the light amount. A detected torque value is calculated using a sensitivity coefficient for converting the relative movement amount detected by the detection head 509 into torque applied to the torque sensor 225.

The optical pattern 541 can include not only one row of gradation pattern but also a plurality of rows of gradation pattern (for example, in different arrangement phases) depending on a calculation method. A pitch of the optical pattern 541 is determined corresponding to a resolution required for position detection. In recent years, a pitch in a micrometer (μm) order has been used with improvement of a precision and a resolution of the encoder.

As described above, each of the torque sensors 221 to 226 can detect torque around the rotation axis C, to which torque is applied, of the respective joints 211 to 216 in which the torque sensors 221 to 226 are respectively arranged.

Figure 5:
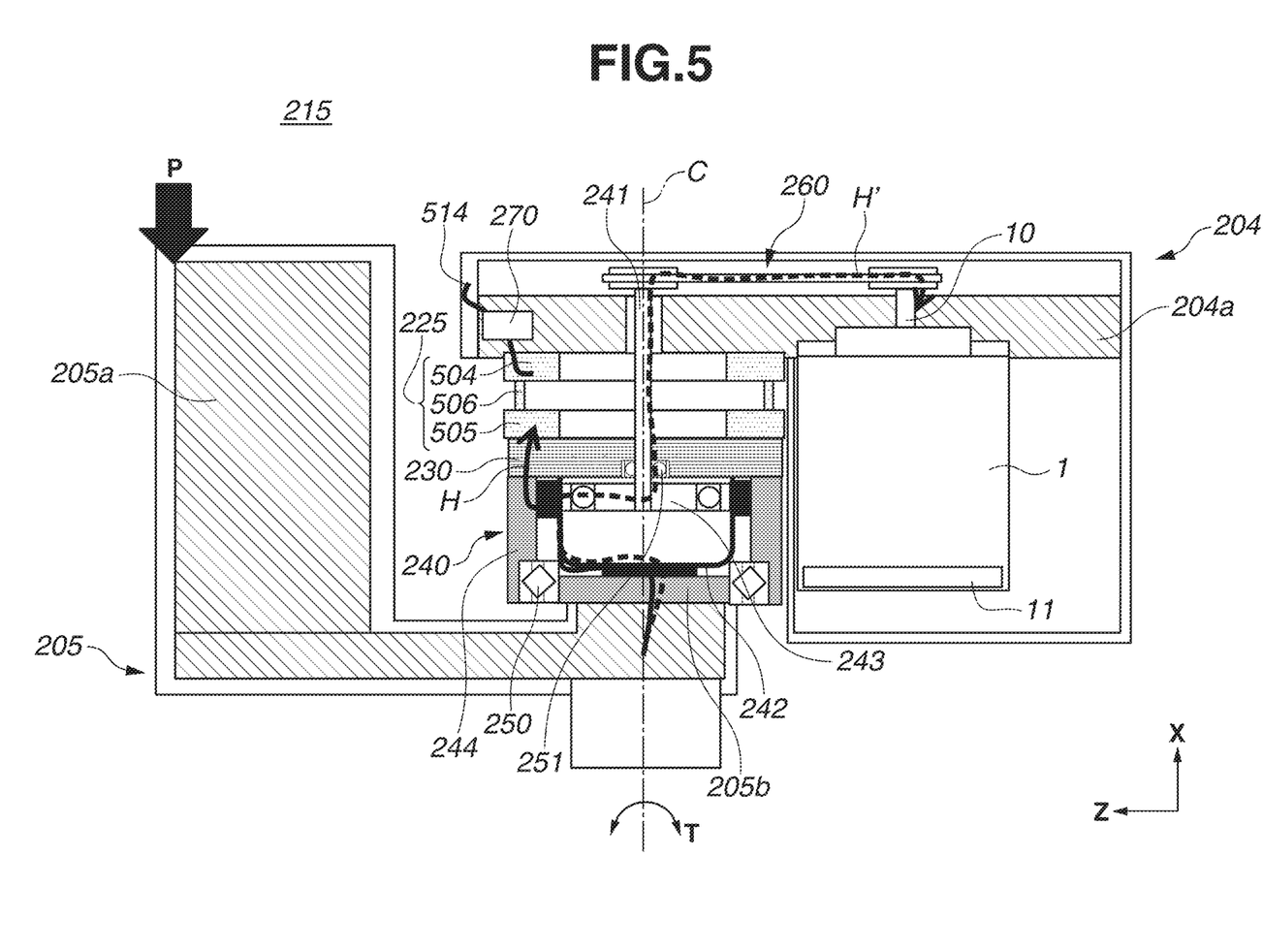
FIG. 5 is a cross-sectional view obtained by cutting along a dashed-dotted line AA in an arrow S direction in FIG. 1.

FIG. 5 is a cross-sectional view near the joint 215 of the robot arm main body 200 illustrated in FIG. 1. FIG. 5 is a cross-sectional view near the joint 215 obtained by cutting along a dashed-dotted line AA in an arrow S direction in FIG. 1.

As illustrated in FIG. 5, the joint 215 includes the motor 1, a reduction gear 240, and the torque sensor 225 that detects torque generated between the links 204 and 205.

The links 204 and 205 include arm frames 204*a* and 205*a*, respectively. The arm frame 204*a* is provided with the motor 1 and the torque sensor 225, and the arm frame 205*a* is provided with the reduction gear 240.

The motor 1 is an electromagnetic motor that can be exemplified by a brushless direct current (DC) motor and an alternate current (AC) servomotor. Power, namely drive of the motor 1, is transmitted to a reduction gear input shaft 241 from a motor rotating shaft 10 of the motor 1 via a transmission mechanism 260 including a timing pulley and a timing belt.

The transmission mechanism 260 is disposed on a side opposite to a side of the motor 1 and the torque sensor 225 across the arm frame 204*a*. The drive of the motor rotating shaft 10 can be transmitted to the reduction gear input shaft 241 by the above-described transmission mechanism 260 even in a state where the motor rotating shaft 10 and the reduction gear input shaft 241 are arranged in parallel.

The encoder 11, which is disposed inside the motor 1, generates an input side pulse signal as the motor rotating shaft 10 is rotated, and outputs the generated input side pulse signal to the control apparatus 300. A brake unit for maintaining a posture of the robot arm main body 200 when power is turned off may be disposed between the motor 1 and the encoder 11 as needed. The encoder 11 may be either an optical encoder or a magnetic encoder as with a general rotary encoder.

The reduction gear 240 outputs a rotation speed of the motor 1 by decelerating the speed at a predetermined speed reduction ratio. An example thereof is a strain wave gearing reduction gear. A case is described below where the reduction gear 240 is a reduction gear of strain wave gearing. However, the reduction gear 240 is not limited thereto, and a reduction gear of any configuration such as an oscillation gearing and a planetary gearing may be used.

The reduction gear 240 includes a reduction gear housing 244, which is a fixed member, and the reduction gear input shaft 241, which is an input member rotating relative to the reduction gear housing 244 by receiving a rotation input. The reduction gear housing 244 is a circular spline that has a gear formed inside.

The reduction gear input shaft 241 is arranged so as to penetrate through a hollow portion of the torque sensor 225. Further, the reduction gear input shaft 241 penetrates through the inside of a support member 230 that supports the reduction gear 240 via a bearing 251. Accordingly, the reduction gear input shaft 241 can freely rotate about the rotation axis C.

The reduction gear 240 further includes a reduction gear output shaft 242 as an output member that rotates relative to the reduction gear housing 244 at a rotation speed that is decelerated relative to the reduction gear input shaft 241. In the present exemplary embodiment, a speed reduction unit 243 is a wave generator, and the reduction gear output shaft 242 is a flex spline.

In FIG. 5, the reduction gear output shaft 242 is arranged between the speed reduction unit 243 and the reduction gear housing 244, decelerated at a predetermined speed reduction ratio relative to rotation of the speed reduction unit 243, and rotated relative to the reduction gear housing 244.

The reduction gear housing 244 of the reduction gear 240 is fixed to the support member 230 by being fastened with a screw and the like.

The reduction gear housing 244 and the support member 230 may be integrally manufactured in advance in some cases depending on a type of the reduction gear 240. However, an example of using separated ones is described in the present exemplary embodiment. Both configurations can be used. Further, the reduction gear housing 244 is connected to a link rotating shaft 205*b* via a bearing 250.

Accordingly, rotation of the reduction gear output shaft 242, which is obtained by decelerating a speed of rotation of the reduction gear input shaft 241 by the speed reduction unit 243, is transmitted to the link rotating shaft 205*b*, and the link 205 rotates relative to the link 204 via the bearing 250. Accordingly, the link 205 can be rotated using the motor 1.

The torque sensor 225 is arranged between the link 204 and the support member 230. The first fixing member 504 of the above-described torque sensor 225 is fixed to the arm frame 204*a* of the link 204, and the second fixing member 505 is fixed to the support member 230.

In other words, the second fixing member 505 of the torque sensor 225 is connected to the reduction gear housing 244 of the reduction gear 240 via the support member 230. The reduction gear output shaft 242 of the reduction gear 240 is fixed and connected to the link 205 via the link rotating shaft 205*b*.

It is assumed that external force P is applied to the link 205, and the torque T is generated around the rotation axis C. In this case, the torque T is transmitted to the link rotating shaft 205*b*, but rotation is regulated by engagement between the reduction gear output shaft 242 and the reduction gear housing 244 illustrated in FIG. 5.

Thus, the torque T transmitted to the reduction gear output shaft 242 is transmitted to the reduction gear housing 244. The torque T transmitted to the reduction gear housing 244 is transmitted to the second fixing member 505 of the torque sensor 225 via the support member 230.

As described above, most of the torque T from the link 205 is transmitted to the second fixing member 505 of the torque sensor 225 through a route H indicated by a solid line arrow in FIG. 5 via the reduction gear housing 244.

Thus, the second fixing member 505 is moved relative to the first fixing member 504. Accordingly, a relative movement amount can be detected using the optical encoder 502 of the above-described torque sensor 225, and the torque T can be calculated.

Further, the first fixing member 504 of the torque sensor 225 is connected to the link 204 that does not rotate, and the wire 514 of the torque sensor 225 is fixed by a clamp mechanism 270 and is pulled out to a side of the link 204. In other words, the torque sensor 225 is arranged at a position where the wire is not bent or twisted in a case where the joint 215 is driven.

Accordingly, if the link 205 performs a rotating operation, the wire 514 is not deformed, i.e., bent or twisted, with the rotating operation of the link 205. As described above, the configuration according to the present exemplary embodiment can prevent the wire 514 of the torque sensor 225 from being repeatedly deformed, whereby a life of the wire 514 can be extended since a load is not repeatedly applied to the wire 514.

In addition, the reduction gear input shaft 241 is provided so as to penetrate through the hollow portion of the torque sensor 225. Accordingly, a dead space that is caused by providing the torque sensor 225 can be used for arrangement of the motor 1, and a joint portion can be prevented from becoming long. Thus, the present exemplary embodiment can achieve downsizing of the robot arm while widening a range of choice for a motor.

Most of the torque T generated by rotation of the link 205 caused by the external force P is transmitted to the second fixing member 505 of the torque sensor 225 through the route H, but actually, the reduction gear input shaft 241 is also rotated by rotation of the reduction gear output shaft 242.

Accordingly, the torque T is slightly transmitted to the motor rotating shaft 10 through a route H' indicated by a broken line arrow in FIG. 5 without going through the torque sensor 225.

Thus, the torque T transmitted to the link 204 without going through the torque sensor 225 due to the rotation of the reduction gear input shaft 241 caused by the rotation of the link 205 is calculated using a method described below.

Figure 6:
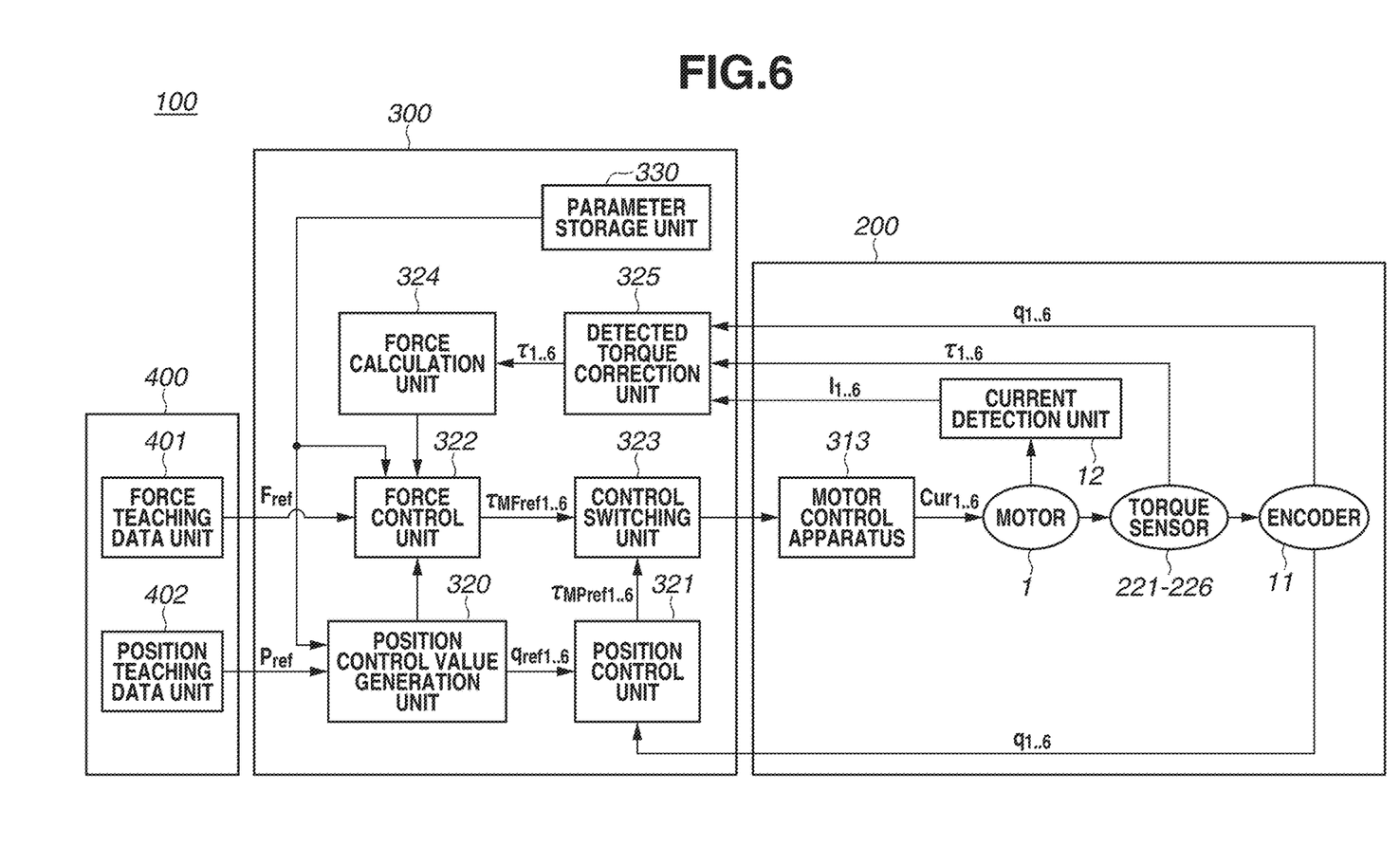
FIG. 6 is a diagram illustrating blocks that perform control of an operation of a robot arm main body in detail in the control block diagram in FIG. 2.
Figure 7:
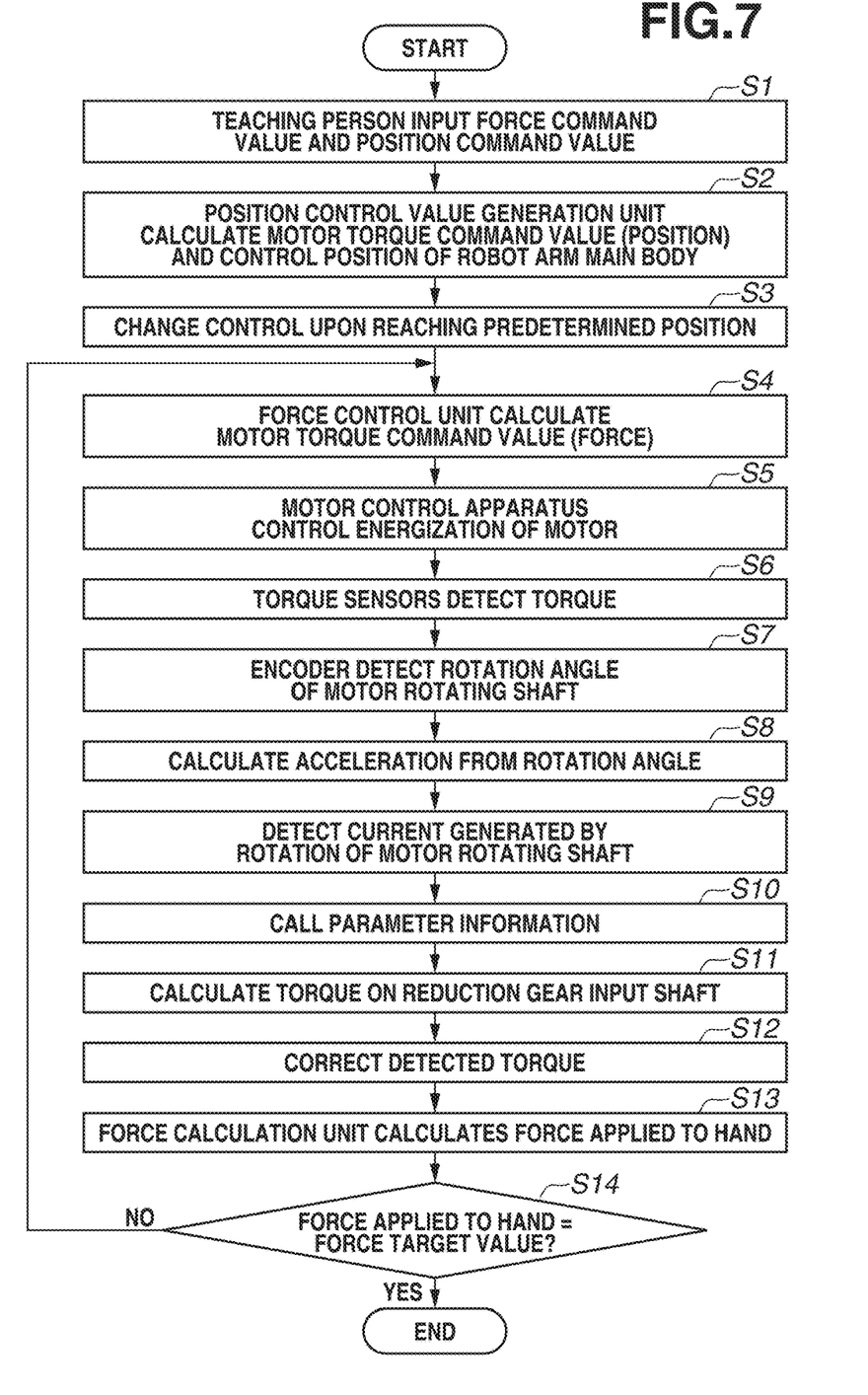
FIG. 7 is a flowchart illustrating a correction method of detected torque according to the first exemplary embodiment.

FIG. 6 is a block diagram illustrating a mechanism that performs torque control and position control in the robot system 100 in detail. FIG. 7 is a flowchart illustrating processing for calculating torque to be transmitted to the reduction gear input shaft 241 and for correcting a detected value of the torque sensor 225 in the torque control according to the present exemplary embodiment.

In FIG. 6, the external input apparatus 400 includes a force teaching data unit 401 and a position teaching data unit 402 that respectively store a force target value $F_{ref}$ and a position target value $P_{ref}$ input by a teaching person. The force target value $F_{ref}$ is a target value to be output by a hand of the robot arm main body 200, and the position target value $P_{ref}$ is a position of the hand of the robot arm main body 200 when the torque control described below is started.

The control apparatus 300 includes a position control value generation unit 320, a position control unit 321, a force control unit 322, a control switching unit 323, a force calculation unit 324, a detected torque correction unit 325, and the parameter storage unit 330 that stores inertial information of the reduction gear 240 and the transmission mechanism 260.

The position control value generation unit 320, the position control unit 321, the force control unit 322, the control switching unit 323, the force calculation unit 324, and the detected torque correction unit 325 are configured in the CPU 301. The parameter storage unit 330 is stored in the ROM 302.

The robot arm main body 200 includes the motor control apparatus 313 that controls the motor 1 using a control value from the control apparatus 300, and the torque sensors 221 to 226 that detect torque between links.

The motor 1 includes a current detection unit 12 that detects a current generated by rotation of the motor rotating shaft 10 of the motor 1, and the encoder 11 that detects the rotation angle of the motor rotating shaft 10 of the motor 1.

In FIG. 6, the position control value generation unit 320 converts the position target value $P_{ref}$ into joint angle command values $q_{ref1 \ldots 6}$ of the respective joints 211 to 216 by referring to the parameter storage unit 330.

The position control unit 321 calculates motor torque command values (positions) $\tau_{MPref1 \ldots 6}$ so that joint angles $q_{1 \ldots 6}$ detected by the encoder 11 follow the joint angle command values $q_{ref1 \ldots 6}$.

The motor control apparatus 313 receives the motor torque command values (positions) $\tau_{MPref1 \ldots 6}$ via the control switching unit 323 to perform position control of the motor 1. The position control described here is to control the rotation angle of the motor rotating shaft 10 of the motor 1 based on feedback from the encoder 11 and to control the position of the hand of the robot arm main body 200.

In a case where the hand of the robot arm main body 200 reaches a predetermined position obtained with use of the encoder 11, the position control unit 321 issues a command to the control switching unit 323 to switch to the force control unit 322.

The force control unit 322 calculates motor torque command values (forces) $\tau_{MFref1 \ldots 6}$ by referring to the parameter storage unit 330 so that force F of the hand of the robot arm main body 200 calculated from torque values $\tau_{1 \ldots 6}$ detected by the torque sensors 221 to 226 follows the force target value $F_{ref}$. The force F is calculated by the force calculation unit 324.

Then, the force control unit 322 transmits the motor torque command values (forces) $\tau_{MFref \ldots 6}$ to the motor control apparatus 313 via the control switching unit 323 to perform force control of the motor 1. The force control described here refers to calculating the force F generated at the hand of the robot arm main body 200 using the torque values $\tau_{1 \ldots 6}$ detected by the torque sensors 221 to 226 and giving feedback thereon to control the rotation angle of the motor 1.

In performing the position control and the force control described above, the motor control apparatus 313 controls energization of the motor 1 so as to achieve the motor torque command value.

It has been described that the force calculation unit 324 calculates the force F using the torque values $\tau_{1 \ldots 6}$ detected by the torque sensors 221 to 226. However, more specifically, the force calculation unit 324 calculates the force F using the torque values $\tau_{1 \ldots 6}$ corrected by the detected torque correction unit 325.

The detected torque correction unit 325 refers to current values $I_{1 \ldots 6}$ detected by the current detection unit 12, the torque values $\tau_{1 \ldots 6}$, rotation angles $q_{1 \ldots 6}$ of the motor rotating shaft 10 of the motor 1, and the parameter storage unit 330. Then, the detected torque correction unit 325 calculates the torque value transmitted to the reduction gear input shaft 241 without going through the torque sensor 225, corrects the torque values $\tau_{1 \ldots 6}$ detected by the torque sensors 221 to 226, and transmits the corrected torque values to the force calculation unit 324. In other words, the detected torque correction unit 325 also has a function as an input shaft torque calculation unit.

A correction method of the torque values $\tau_{1 \ldots 6}$ is described in detail below with reference to the flowchart in FIG. 7.

In step S1 in FIG. 7, a teaching person inputs a predetermined force command value and a position command value from the external input apparatus 400.

In step S2, the position control value generation unit 320 calculates the motor torque command values (positions) $\tau_{MPref1 \ldots 6}$ and controls a position of the robot arm main body 200.

In step S3, in a case where the hand of the robot arm main body 200 reaches the predetermined position, the control switching unit 323 switches from the position control to the force control.

In step S4, the force control unit 322 calculates the motor torque command values (forces) $\tau_{MFref1\ldots6}$ and transmits the calculated values (forces) $\tau_{MFref1\ldots6}$ to the motor control apparatus 313. Since the motor 1 is not driven yet in this stage, the torque values $\tau_{1\ldots6}$ are considered to be zero in calculating the motor torque command values (forces) $\tau_{MFref1\ldots6}$.

In step S5, the motor control apparatus 313 controls energization of the motor 1 based on the motor torque command values (forces) $\tau_{MFref1\ldots6}$ transmitted from the force control unit 322.

In step S5, in a case where the motor 1 is driven, torque is generated in the torque sensors 221 to 226 between the links 201 to 206 due to their own weights. In step S6, the torque sensors 221 to 226 respectively detect the torque values $\tau_{1\ldots6}$ of the generated torque.

In step S7, the encoder 11 detects the rotation angle of the motor rotating shaft 10. The angle detected here is the rotation angle of the motor rotating shaft 10 that rotates by following the reduction gear input shaft 241 via the transmission mechanism 260 when the reduction gear input shaft 241 is rotated by torque that is generated by the own weights of the links 201 to 206 and the external force P and that passes through the above-described route H'.

In step S8, acceleration $\omega_{1\ldots6}$ of the motor rotating shaft 10 rotated by the own weights of the links 201 to 206 and the external force P is calculated from the rotation angle of the motor obtained in step S7. Step S8 is an acceleration calculation process. Further, the detected torque correction unit 325 also serves as an acceleration calculation unit.

In step S9, the current detection unit 12 detects the currents $I_{1\ldots6}$ generated by the rotation of the motor rotating shaft 10 described above.

In step S10, the detected torque correction unit 325 refers to the parameter storage unit 330, and calls inertial information $J_m$ of the motor 1, inertial information $J_g$ of the reduction gear 240, a belt efficiency K of the transmission mechanism 260, and a torque constant $K_t$ when torque is applied to the motor rotating shaft 10. The parameter storage unit 330 stores the above-described information as a table. Step S10 is a parameter calling process.

In step S11, the detected torque correction unit 325 calculates torque applied to the reduction gear input shaft 241 by following Equation 1. For convenience sake, $\tau_{a1\ldots6}$ is torque applied to each of the reduction gear input shafts 241.

$$\tau_{a1\ldots6} = K*(K_t*I_{1\text{-}6} - (J_m+J_g)*(\omega_{a1\ldots6})) \quad \text{(Equation 1)}$$

In Equation 1, $(K_t*I_{1\ldots6})$ is torque generated by the motor rotating shaft 10 and can be calculated from a current flowing through the motor 1 and the torque constant.

Torque $\tau_a$ applied to the reduction gear input shaft 241 can be calculated by subtracting torque as noise caused by inertia of the reduction gear 240 and the motor 1 from $(K_t*I_{1\text{-}6})$ and by multiplying the result by the transmission efficiency K of the transmission mechanism 260.

The transmission efficiency K mainly depends on a belt of the transmission mechanism 260 and is about 0.9 to 0.95. In a case where the transmission mechanism 260 does not include the belt, the transmission efficiency K is 1.0.

In step S12, the detected torque correction unit 325 corrects the detected torque values $\tau_{1\ldots6}$ by adding the calculated torque $\tau_{a1\ldots6}$ applied to the respective reduction gear input shafts 241 thereto, and transmits the corrected torque values to the force calculation unit 324.

In step S13, the force calculation unit 324 calculates the force applied to the hand of the robot arm main body 200 based on the corrected torque values transmitted from the detected torque correction unit 325.

In step S14, the detected torque correction unit compares the force applied to the hand of the robot arm main body 200 calculated in step S13 with the force target value, and determines whether the both values coincide with each other. If it is determined that the both values do not coincide (NO in step S14), processing returns to step S4, and the force control is executed again. If it is determined that the both values coincide (YES in step S14), the force control is terminated.

In the above-described control method, the correction operation of the detected torque values $\tau_{1\ldots6}$ in steps S7 to S12 is executed by the detected torque correction unit 325.

By the above-described correction method, the torque transmitted to the motor rotating shaft 10 through the route H' without going through the torque sensors 221 to 226 can be calculated and can be corrected to be the detected torque value.

Accordingly, detection accuracy of the torque sensor can be improved, and control with higher accuracy can be executed on the robot arm main body.

According to the above-described first exemplary embodiment, the transmission mechanism 260 is constituted of a belt and a pulley. However, the present disclosure can also be implemented by using, for example, a bevel gear. A second exemplary embodiment is described in detail below.

Part of hardware and control system configurations different from those of the first exemplary embodiment are illustrated and described below. Part of configurations similar to those of the first exemplary embodiment are regarded as having the same configuration and function, so that a detailed description thereof is omitted.

Figure 8:
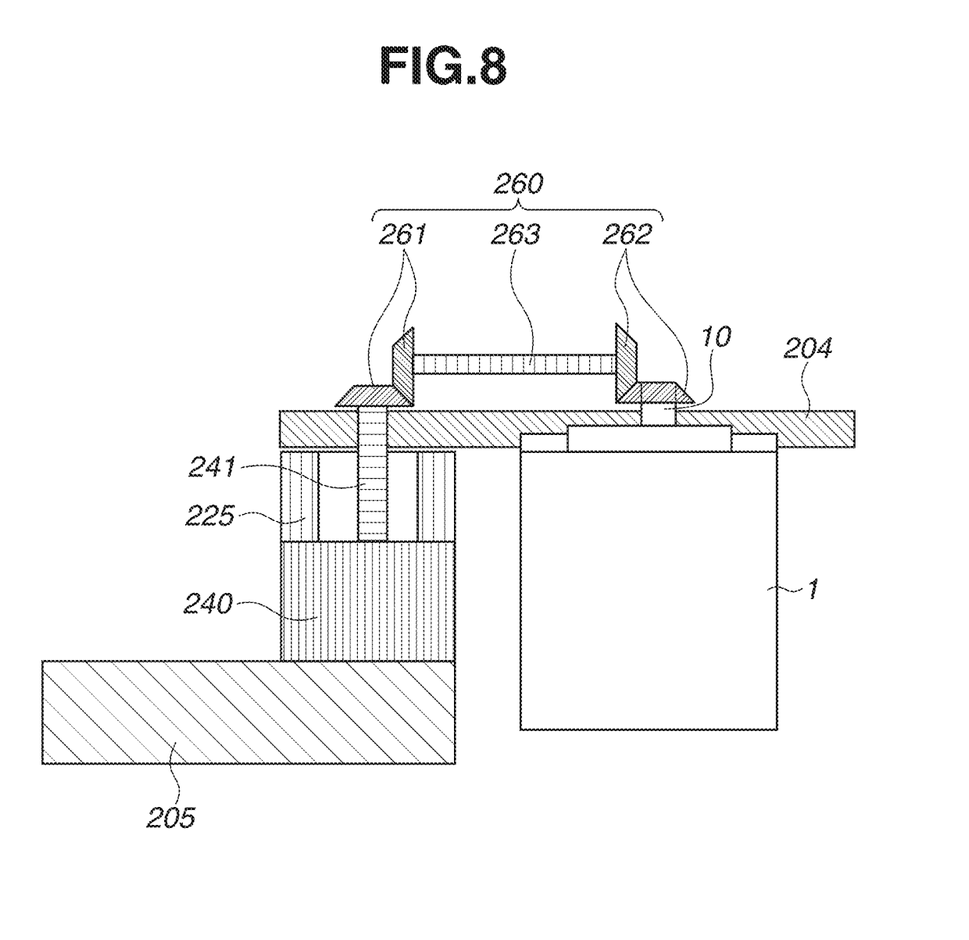
FIG. 8 is a diagram illustrating a joint portion of a robot arm main body according to a second exemplary embodiment.

FIG. 8 is a schematic diagram illustrating a case where the transmission mechanism 260 is constituted of bevel gears 261 and 262 and a transmission shaft 263 in the cross-sectional view of the joint 215 according to the first exemplary embodiment illustrated in FIG. 5.

In FIG. 8, the bevel gear 261 is disposed on an end portion of the reduction gear input shaft 241 and an end portion of the transmission shaft 263, and the bevel gear 262 is disposed on an end portion of the motor rotating shaft 10 and an end portion of the transmission shaft 263.

Accordingly, a power transmission route from the motor 1 can be bent at a right angle, and the power of the motor 1 can be transmitted to the reduction gear input shaft 241 even if the motor rotating shaft 10 is arranged in parallel to the reduction gear input shaft 241 as in the case of the first exemplary embodiment.

Then, a value corresponding to the bevel gear 261 is used as the transmission efficiency K in calculating the torque $\tau_a$ applied to the reduction gear input shaft 241 that is calculated for correcting the detected torque.

As described above, even if the bevel gears are used in the transmission mechanism 260, a dead space that is formed by providing the torque sensor 225 can be used for arranging the reduction gear 240 and the motor 1, whereby a joint portion can be prevented from becoming long as in the case of the first exemplary embodiment. Thus, the present exemplary embodiment can achieve downsizing of the robot arm while widening a range of choice for the motor.

Further, even if the configuration of the transmission mechanism 260 is different from that of the first exemplary embodiment, by using a parameter corresponding to the mechanism of the transmission mechanism 260, torque applied to the reduction gear input shaft 241 can be calculated, and the detected torque can be corrected.

Processing procedures according to the above-described first and second exemplary embodiments are specifically executed by the control apparatus 300. Thus, a control program of software that can execute the above-described functions and a storage medium storing the control program are included in the present disclosure.

Further, according to the above-described exemplary embodiments, the ROM 302 or the RAM 303 is a computer-readable storage medium, and the ROM 302 or the RAM 303 stores the control program. However, the present disclosure is not limited to this configuration. A control program for implementing the present disclosure can be stored in any storage medium as long as it is a computer-readable storage medium. For example, as a storage medium for providing the control program, an HDD, an external storage device, a recording disk, and the like may be used.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

OTHER EMBODIMENTS

According to the above-described first and second exemplary embodiments, the robot arm main body 200 is a six-joint robot having six joints. However, the number of the joints is not limited to six. A vertical multi-axis configuration has been described as a type of the robot arm main body 200. However, a configuration similar to the above-described one can also be implemented in a joint of the robot arm main body 200 of a different type such as a parallel link type.

The configuration examples of the joint of the robot arm main body 200 have been illustrated in FIGS. 5 and 8. However, the configuration of the joint is not limited to the above-described examples, and the design thereof can be arbitrarily modified by a person skilled in the art. Further, the motor 1 is not limited to the above-described configuration, and the driving source for driving each of the joints may also be a device such as an artificial muscle.

Further, the optical encoder is used as the torque sensors 221 to 226 in the above-described exemplary embodiments for detecting the relative movement amount of the first fixing member 504 to the second fixing member 505. However, another embodiment can also be used. For example, in a method for magnetically measuring displacement, a magnetic flux generating source and a magnetoelectric conversion element may be arranged on either the first fixing member 504 or the second fixing member 505. The first fixing member 504 and the second fixing member 505 are relatively moved, and magnitude of a magnetic flux density flowing into the magnetoelectric conversion element is changed with a change in a distance between the magnetic flux generating source and the magnetoelectric conversion element. Accordingly, an output of the magnetoelectric conversion element is changed with the change in the magnetic flux density. The displacement can be measured by detecting the change in the output of the magnetoelectric conversion element. While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-105482, filed May 31, 2018, which is hereby incorporated by reference herein in its entirety.

What is claimed is:

1. A driving mechanism to relatively rotate a first link and a second link, the driving mechanism comprising:
   a motor having a motor rotating shaft;
   a reduction unit of a reduction gear;
   an input shaft of the reduction gear configured to rotate in an interlocked manner with the motor rotating shaft;
   an output shaft of the reduction gear configured to transmit drive of the motor to the second link with a reduction in speed by the reduction unit;
   a housing engaged with the output shaft, connected to the second link via a bearing, and/or supporting the input shaft via a bearing;
   a structure including a first member and a second member, wherein the first member is connected to the first link, the second member is connected to the housing, the first member and the second member are configured to move relatively by rotation of the second link, and the housing is connected to the first link via the structure; and
   a control unit,
   wherein, in performing control, the control unit acquires a first value corresponding to an amount of a relative movement between the first member and the second member, the control unit acquires, separately from the first value, a second value corresponding to rotation of the motor rotating shaft or corresponding to rotation the input shaft, and the control unit acquires, based on the first value and the second value, a third value corresponding to a torque between the first link and the second link.

2. The driving mechanism according to claim 1, wherein the input shaft is surrounded by the structure.

3. The driving mechanism according to claim 1,
wherein the structure is arranged between the housing and the first link, and
wherein the motor rotating shaft and the input shaft are arranged so as to be in parallel to each other.

4. The driving mechanism according to claim 1, wherein the structure includes a coupling member configured to couple the first member and the second member together in a relatively movable manner.

5. The driving mechanism according to claim 1, wherein the structure includes a detection unit configured to detect the relative movement of the first member to the second member at a predetermined position between the first member and the second member.

6. The driving mechanism according to claim 5,
wherein the first link includes a frame, and
wherein a wire of the detection unit is fixed to the frame.

7. The driving mechanism according to claim 1, further comprising a transmission mechanism configured to transmit drive of the motor rotating shaft to the input shaft.

8. The driving mechanism according to claim 7,
wherein the first link includes a frame,
wherein the motor and the structure are provided on the frame, and
wherein, with respect to the frame, the transmission mechanism is provided on a side opposite of a side where the motor and the structure are provided.

9. The driving mechanism according to claim 7, wherein the transmission mechanism is a bevel gear.

10. The driving mechanism according to claim 7, wherein the transmission mechanism is a belt.

11. The driving mechanism according to claim 7, wherein the control unit includes an input shaft torque acquisition unit configured to acquire an input shaft torque applied to the motor rotating shaft or the input shaft by rotation of the motor rotating shaft or the input shaft caused by rotation of the second link.

12. The driving mechanism according to claim 11, wherein the motor rotating shaft or the input shaft rotates by rotation of the output shaft of the reduction gear configured to rotate in the interlocked manner by rotation of the second link.

13. The driving mechanism according to claim 11, wherein the control unit includes a torque updating unit configured to update, based on the input shaft torque calculated by the input shaft torque acquisition unit, the input shaft torque acquired based on the relative movement.

14. The driving mechanism according to claim 11,
wherein the motor includes a position detection unit configured to detect a position of the motor rotating shaft, and includes a current detection unit configured to detect a current generated by rotation of the motor rotating shaft,
wherein the control unit includes an acceleration acquisition unit and a parameter storage unit,
wherein the acceleration acquisition unit is configured to acquire acceleration of rotation of the motor rotating shaft based on a value detected by the position detection unit,
wherein the parameter storage unit is configured to store inertial information of the motor, inertial information of the transmission mechanism, inertial information of the reduction gear, and a value of transmission efficiency of the transmission mechanism, and
wherein the input shaft torque acquisition unit is configured to acquire the input shaft torque from detected values from the position detection unit and the current detection unit, a value of the acceleration of the rotation of the motor rotating shaft, the inertial information of the motor, the inertial information of the transmission mechanism, the inertial information of the reduction gear, and the value of the transmission efficiency of the transmission mechanism.

15. The driving mechanism according to claim 1,
wherein the structure and an encoder fixed to the structure constitute a torque sensor,
wherein the first value is a value corresponding to an output of the torque sensor, and
wherein the third value between the first link and the second link is acquired based on a sum of the first value and the second value.

16. A robot arm comprising:
a plurality of joints; and
the driving mechanism according claim 1,
wherein the motor, the reduction gear, and the structure of the driving mechanism are provided on at least one of the plurality of joints.

17. A method for manufacturing an article using the robot arm according to claim 16, wherein the article is manufactured by operating the robot arm by controlling the motor based on the torque between the first link and the second link.

18. A robot apparatus comprising:
a robot arm having a plurality of joints and the driving mechanism according claim 1; and
a robot hand connected to the robot arm,
wherein the motor, the reduction gear, and the structure of the driving mechanism are provided on at least one of the plurality of joints.

19. A control method for controlling a driving mechanism to relatively rotate a first link and a second link,
wherein the driving mechanism includes:
a motor having a motor rotating shaft,
a reduction unit of a reduction gear,
an input shaft of the reduction gear configured to rotate in an interlocked manner with the motor rotating shaft,
an output shaft of the reduction gear configured to transmit drive of the motor to the second link with a reduction in speed by the reduction unit,
a housing engaged with the output shaft, connected to the second link via a bearing, and/or supporting the input shaft via a bearing, and
a structure including a first member and a second member, wherein the first member is connected to the first link, the second member is connected to the housing, the first member and the second member are configured to move relatively by rotation of the second link, and the housing is connected to the first link via the structure,
the control method comprising:
acquiring a first value corresponding to an amount of a relative movement between the first member and the second member;
acquiring, separately from the first value, a second value corresponding to rotation of the motor rotating shaft or corresponding to rotation the input shaft; and
acquiring, based on the first value and the second value, a third value corresponding to a torque between the first link and the second link.

20. A non-transitory computer-readable storage medium storing a program for executing the control method according to claim 19.

* * * * *